(12) United States Patent
Merrill

(10) Patent No.: US 6,940,551 B2
(45) Date of Patent: Sep. 6, 2005

(54) ACTIVE PIXEL SENSOR WITH NOISE CANCELLATION

(75) Inventor: Richard B. Merrill, Woodside, CA (US)

(73) Assignee: Foveon, Inc., Santa Clara, CA (US)

(*) Notice: Subject to any disclaimer, the term of this patent is extended or adjusted under 35 U.S.C. 154(b) by 441 days.

(21) Appl. No.: 09/963,027

(22) Filed: Sep. 24, 2001

(65) Prior Publication Data

US 2002/0036700 A1 Mar. 28, 2002

Related U.S. Application Data

(60) Provisional application No. 60/235,375, filed on Sep. 25, 2000.

(51) Int. Cl.[7] .............................................. H04N 5/335
(52) U.S. Cl. ........................ 348/301; 348/241; 348/308
(58) Field of Search ................................ 348/294, 300, 348/301, 302, 308, 333.01, 241, 243, 248; 250/208.1; 257/72, 361, 362, 223, 229, 230

(56) References Cited

U.S. PATENT DOCUMENTS

| | | |
|---|---|---|
| 3,946,151 A | 3/1976 | Kamiyama et al. |
| 4,156,818 A | 5/1979 | Collins et al. |
| 4,293,877 A | 10/1981 | Tsunekawa et al. |
| 4,363,963 A | 12/1982 | Ando |
| 4,377,742 A | 3/1983 | Kawabata et al. |
| 4,418,284 A | 11/1983 | Ogawa et al. |
| 4,450,466 A | 5/1984 | Nishizawa et al. |
| 4,463,383 A | 7/1984 | Soneda et al. |
| 4,527,879 A | 7/1985 | Hosoe et al. |
| 4,565,935 A | 1/1986 | Rolfe |
| 4,652,766 A | 3/1987 | Wang et al. |
| 4,682,236 A | 7/1987 | Wang et al. |
| 4,683,580 A | 7/1987 | Matsunaga |
| 4,686,554 A | 8/1987 | Ohmi et al. |
| 4,736,191 A | 4/1988 | Matzke et al. |
| 4,737,832 A | 4/1988 | Kyuma |
| 4,743,955 A | 5/1988 | Matsumoto |
| 4,751,559 A | 6/1988 | Sugawa et al. |
| 4,757,200 A | 7/1988 | Shepherd |
| 4,772,957 A | 9/1988 | Nakagawa et al. |
| 4,791,286 A | 12/1988 | Wall |
| 4,797,560 A | 1/1989 | Berger et al. |
| 4,809,075 A | 2/1989 | Akimoto et al. |
| 4,810,896 A | 3/1989 | Tanaka et al. |
| 4,814,846 A | 3/1989 | Matsumoto et al. |

(Continued)

FOREIGN PATENT DOCUMENTS

| | | | |
|---|---|---|---|
| EP | 0 854 516 | 7/1998 | ......... H01L/27/146 |
| JP | 09-205588 | 8/1997 | .......... H04N/5/335 |
| WO | WO 99/66712 | 12/1999 | ............ H04N/3/15 |

OTHER PUBLICATIONS

P. Noble, P., "Self–Scanned Silicon Image Detector Arrays", *IEEE Transactions on Electron Devices*, vol. ED–15., No. 4., pp. 202–208, Apr. 1968.

O. Yadid–Pecht et al., "A Random Access Photodiode Array for Intelligent Image Capture", *IEEE Transactions on Electron Devices*, vol. 38., No. 8., pp. 772–780, Aug. 1991.

E. Fossum, "Active Pixel Sensors: Are CCD's Dinosaurs?", *SPIE*, vol. 1990., pp. 2–14, Jul. 1993.

*Primary Examiner*—Tuan Ho
(74) *Attorney, Agent, or Firm*—Sierra Patent Group, Ltd.

(57) ABSTRACT

A CMOS active pixel sensor with noise reduction employs a photodetector. A reset switch is coupled between a reset potential line and the photodetector and is controlled by a reset line. An amplifier is coupled to the photodetector. A kTC noise reducing circuit is disposed within the pixel sensor. A readout circuit is coupled to the kTC noise reducing circuit and is controlled by a row-select line.

11 Claims, 8 Drawing Sheets

U.S. PATENT DOCUMENTS

| | | |
|---|---|---|
| 4,816,889 A | 3/1989 | Matsumoto |
| 4,831,454 A | 5/1989 | Tanaka et al. |
| 4,835,404 A | 5/1989 | Sugawa et al. |
| 4,847,668 A | 7/1989 | Sugawa et al. |
| 4,866,293 A | 9/1989 | Nakamura et al. |
| 4,879,470 A | 11/1989 | Sugawa et al. |
| 4,902,886 A | 2/1990 | Smisko |
| 4,906,855 A | 3/1990 | Berger et al. |
| 4,959,723 A | 9/1990 | Hashimoto |
| 4,962,412 A | 10/1990 | Shinohara et al. |
| 4,967,067 A | 10/1990 | Hashimoto et al. |
| 4,972,243 A | 11/1990 | Sugawa et al. |
| 4,977,096 A | 12/1990 | Shimada et al. |
| 5,038,214 A | 8/1991 | Miida |
| 5,060,042 A | 10/1991 | Shinohara et al. |
| 5,101,252 A | 3/1992 | Matsumoto |
| 5,113,254 A | 5/1992 | Kanno et al. |
| 5,155,351 A | 10/1992 | Yamanobe et al. |
| 5,182,446 A | 1/1993 | Tew |
| 5,194,943 A | 3/1993 | Tomita et al. |
| 5,216,510 A | 6/1993 | Amingual et al. |
| RE34,309 E | 7/1993 | Tanaka et al. |
| 5,227,887 A | 7/1993 | Dohi et al. |
| 5,260,560 A | 11/1993 | Yamanobe et al. |
| 5,276,521 A | 1/1994 | Mori |
| 5,283,428 A | 2/1994 | Morishita et al. |
| 5,289,023 A | 2/1994 | Mead |
| 5,309,013 A | 5/1994 | Suzuki et al. |
| 5,315,114 A | 5/1994 | Kansy et al. |
| 5,317,174 A | 5/1994 | Hynecek |
| 5,335,008 A | 8/1994 | Hamasaki |
| 5,341,008 A | 8/1994 | Hynecek |
| 5,355,165 A | 10/1994 | Kosonocky et al. |
| 5,384,596 A | 1/1995 | Kobayashi et al. |
| 5,386,108 A | 1/1995 | Arikawa et al. |
| 5,396,289 A | 3/1995 | Nakamura |
| 5,424,223 A | 6/1995 | Hynecek |
| 5,428,391 A | 6/1995 | Murata et al. |
| 5,434,620 A | 7/1995 | Higuchi et al. |
| 5,461,425 A | 10/1995 | Fowler et al. |
| 5,541,402 A | 7/1996 | Ackland et al. |
| 5,541,654 A | 7/1996 | Roberts |
| 5,576,763 A | 11/1996 | Ackland et al. |
| 5,587,738 A | 12/1996 | Shinohara |
| 5,591,960 A | 1/1997 | Furukawa et al. |
| 5,598,023 A | 1/1997 | Matsumoto |
| 5,625,210 A | 4/1997 | Lee et al. |
| 5,668,596 A | 9/1997 | Vogel |
| 5,739,562 A | 4/1998 | Ackland et al. |
| 5,742,058 A | 4/1998 | Pantigny et al. |
| 5,838,176 A | 11/1998 | Delbruck et al. |
| 5,864,362 A | 1/1999 | Cutler |
| 5,900,623 A | 5/1999 | Tsang et al. |
| 5,986,301 A | 11/1999 | Fukushima et al. |
| 6,046,444 A | 4/2000 | Afghahi |
| 6,078,037 A | 6/2000 | Booth, Jr. |
| 6,115,066 A | 9/2000 | Gowda et al. |
| 6,211,510 B1 | 4/2001 | Merrill et al. |
| 6,535,247 B1 * | 3/2003 | Kozlowski et al. ......... 348/241 |
| 6,549,235 B1 * | 4/2003 | Fossum et al. ............. 348/308 |
| 6,580,106 B2 * | 6/2003 | Hynecek ..................... 257/223 |
| 6,587,142 B1 * | 7/2003 | Kozlowski et al. ......... 348/241 |
| 2002/0017646 A1 * | 2/2002 | Hynecek ..................... 257/72 |
| 2002/0093034 A1 * | 7/2002 | Hynecek ..................... 257/204 |

OTHER PUBLICATIONS

S. Mendis et al., "A 128×128 CMOS Active Pixel Image Sensor for Highly Integrated Imaging Systems", *IEDM*, pp. 583–586, 1993.

T. Delbruck et al., "Analog VLSI Adaptive, Logarithmic, Wide–Dynamic–Range Photoreceptor", *IEEE ISCAS '94 Proceedings of the International Symposium on Circuits and Systems*, (London), pp. 1–4, May 1994.

A. Dickinson et al., "TP 13.5: A 256×256 CMOS Active Pixel Image Sensor with Motion Detection", *1995 Digest of Technical Papers from the 1995 IEEE International Solid–State Circuits Conference*, vol. 38, pp. 226–227, Jan. 1995.

T. Delbruck, et al., "Analog VLSI Phototransduction by continuous–time, adaptive, logarithmic photoreceptor circuits", *California Institute of Technology Computation and Neural Systems Program*, CNS Memo No. 30., pp. 1–24, Apr. 2, 1996.

D. Yang et al., "Test Structures for Characteristics and Comparative Analysis of CMOS Image Sensors", *SPIE*, vol. 2950., pp. 8–17, Aug. 1996.

H. Wong, "Technology and Device Scaling Considerations for CMOS Imagers", *IEEE Transactions on Electron Devices*, vol. 43., No. 12., pp. 2131–2142, Dec. 1996.

S. Mendis et al., "CMOS Active Pixel Image Sensors for Highly Integrated Imaging Systems", *IEEE Journal of Solid–State Circuits*, vol. 32., No. 2., pp. 187–196, Feb. 1997.

McGrath et al., "Current–Mediated, Current–Reset 768×512 Active Pixel Sensor Array", *Digest of Technical Papers*, Feb. 7, 1997, pp. 182–183; 1997 ISSCC Slide Supplement IEEE, pp. 138–139.

A. Blanksby et al., "Noise Performance of a Color CMOS Photogate Image Sensor", *IEDM*, pp. 205–208, Jul. 1997.

Decker, S., "A Wide Dynamic Range CMOS Imager With Parallel On–Chip Analog–to–Digital Conversation", *Massachusetts Institute of Technology*, Sep. 1997, pp. 3–205.

J. Hurwitz et al., "An 800K–Pixel Color CMOS Sensor For Consumer Still Cameras.", *SPIE*, vol. 3019, pp. 115–124, Nov. 1997.

R. Guidash et al., "A 0.6 μm CMOS Pinned Photodiode Color Imager Technology", *IEDM*, pp. 927–929, 1997 (Month Unknown).

A. Gamal et al., "Modeling and Estimation of FPN Components in CMOS Image Sensors", *Proc. of SPIE*, vol. 3301., pp. 178–185, Apr. 1998.

G. Yang et al., "A Snap–Shot CMOS Active Pixel Imager for Low–Noise, High–Speed Imaging", *IEDM International Electron Devices Meeting*, Dec. 6–9, 1998.

S. Decker et al., "A 256×256 CMOS Imaging Array with Wide Dynamic Range Pixels and Column–Parallel Digital Output", *IEEE International Solid–State Circuits Conference*, p. 176, 1998 month unknown.

K. Yonemoto, "MP 6.1 A CMOS Image Sensor with a Simple FPN–Reduction Technology and a Hole Accumulated Diode", *2000 Digest of Technical Papers from the International Solid–State Circuits Conference*, vol. 43, pp. 102–103, Feb. 2000.

K. Findlater et al., "A CMOS Image Sensor Employing a Double Junction Photodiode", pp. 60–63. (Date and Source Publication unknown.).

* cited by examiner

Table 1: measured noise (2)

|  | $v_1$ =noise during hard reset mV | $v_2$ =noise of dark level mV | $v_3$ =reset kTC noise mV (1) |
|---|---|---|---|
| control pixel- no noise cancellation | 0.42 (2) | 1.11 | 1.02 |
| noise cancellation pixel- 10 fF | 0.39 | 0.67 | 0.52 |
| noise cancellation pixel- 80 fF | 0.31 | 0.36 | 0.18 |

(1) $v_2^2 = v_1^2 + v_3^2$ (2) measured noise at the pixel output; noise refered at the charge to voltage conversion node is divided by the amplifer gian = 0.5X

ACTIVE PIXEL SENSOR WITH NOISE CANCELLATION

RELATED APPLICATIONS

This application claims priority from provisional patent application Ser. No. 60/235,375, filed Sep. 25, 2000.

BACKGROUND OF THE INVENTION

1. Field of the Invention

The present invention relates to active pixel sensors. More particularly, the present invention relates to active pixel sensors with kTC noise cancellation.

2. The Prior Art

In image sensors, an important source of noise is thermal reset noise, also known as kTC noise. Virtually all charge-coupled-device (CCD) imagers employ kTC noise cancellation because it is relatively easy to implement in CCD architectures, where the charge mode signal is brought to a single noise cancellation circuit (usually off chip). Elimination of kTC noise results in improved dynamic range, defined as the ratio between charge capacity and dark noise level. The dynamic range is the most often quoted figure of merit for CCD imager performance.

It is therefore not surprising that prospective CMOS imager vendors attempt to emulate this aspect of CCD imager performance. However, kTC noise cancellation is not as easy to implement in CMOS imagers as it is in CCD imagers since the read (charge-to-voltage conversion) circuit is inside the pixel sensor. The most common scheme used is referred to as correlated double sampling (CDS), in which the reset level is read out, then the signal level is read out, and then a subtraction operation is performed at the bottom of the column. (Dickenson, A., et al., "A 256X256 CMOS Active Pixel Image Sensor with Motion Detection," 1995 DIGEST of TECHNICAL PAPERS, Institute of Electrical and Electronics Engineers, Volume Thirty-Eight, ISSN 0193-6530, Technical Paper 13.5, February 1995). However, this technique lends itself to the introduction of column pattern noise. A recent paper has described a once-per-die kTC noise canceling circuit. (Yonemoto K., et al., "A CMOS Image Sensor with a Simple FPN-Reduction Technology and a Hole Accumulated Diode," 2000 DIGEST of TECHNICAL PAPERS, Institute of Electrical and Electronics Engineers, Volume Fourty-Three, ISSN 0193-6530, MP 6.1, February 2000). This approach will be difficult to implement for large arrays, due to the long settling time involved in reading the reference and signal levels. Furthermore, both of these cited prior-art approaches need a special charge-transfer active pixel sensor, such as a photo-gate active pixel sensor, that can store the signal charge while the reset charge is read out.

SUMMARY OF THE INVENTION

A CMOS active pixel sensor with noise reduction employs a photodetector. A reset switch is coupled between a reset potential line and the photodetector and is controlled by a reset signal line. An amplifier is coupled to the photodetector. A kTC noise reducing circuit is disposed within the pixel sensor. A readout circuit is coupled to the kTC noise reducing circuit and is controlled by a row-select line.

In an illustrative embodiment of the invention, a first reset transistor has a drain coupled to a first reset potential line, a gate coupled to a first reset signal line, and a source coupled to the photodetector through a barrier transistor having a gate coupled to a barrier potential. A first source-follower amplifier transistor has a drain coupled to a first source-follower drain potential line, a gate coupled to the source of the first reset transistor, and a source coupled to the drain of a bias transistor. The bias transistor has a gate coupled to a bias potential line, and a source coupled to a fixed potential line. A capacitor has a first terminal coupled to the source of the first source-follower amplifier transistor and a second terminal coupled to the source of a second reset transistor. The second reset transistor has a drain coupled to a second reset potential line, and a gate coupled to a second reset signal line. A second source-follower amplifier transistor has a drain coupled to a second source-follower drain potential line, a gate coupled to the second terminal of the capacitor, and a source coupled to the drain of a row-select transistor. The row-select transistor has a gate coupled to a row-select line, and a source coupled to a column output line.

The noise cancellation circuit of the illustrative embodiment comprises the first source-follower amplifier transistor, the bias transistor, the capacitor, and the second reset transistor. The other elements recited are typical of prior active pixel sensors.

The capacitor is preferably a MOS capacitor. In another embodiment of the invention, the capacitor may be formed as an embedded DRAM capacitor such as is available in current CMOS DRAM processes. Such capacitors provide relatively large values of capacitance in a relatively small area.

According to a method for reducing kTC noise in a CMOS active pixel sensor, a reset potential is applied to a photodetector within the active pixel sensor. A noise component of the reset potential is stored within the active pixel sensor. Photogenerated charge is integrated on the photodetector for an integration period to generate a signal. The noise component is subtracted from the signal within the storage pixel sensor, and the signal minus the noise is read out of the pixel sensor.

In a method according to the present invention for operating the active pixel sensor, the first and second reset signals are turned on. The first reset signal is turned off and then the second reset signal is then turned off following a small time delay.

In another embodiment of the present invention, an active pixel sensor includes an explicit embedded DRAM capacitor at the gate of the amplifier transistor in the pixel sensor. An available embedded DRAM capacitor as shown herein can have a capacitance of about 50 fF, which can absorb about 300,000 electrons at 1V. Shot noise of about 300,000 electrons is 550 electrons, or 0.2% of full scale. This corresponds to about nine bits of resolution. In contrast, to obtain the same level of resolution, a gate oxide capacitor would occupy about 10 um$^2$, or about 40% of the area of a pixel sensor, which would significantly decrease the pixel area available for collecting light.

BRIEF DESCRIPTION OF THE DRAWING FIGURES

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons having the benefit of this disclosure.

Figure 1:
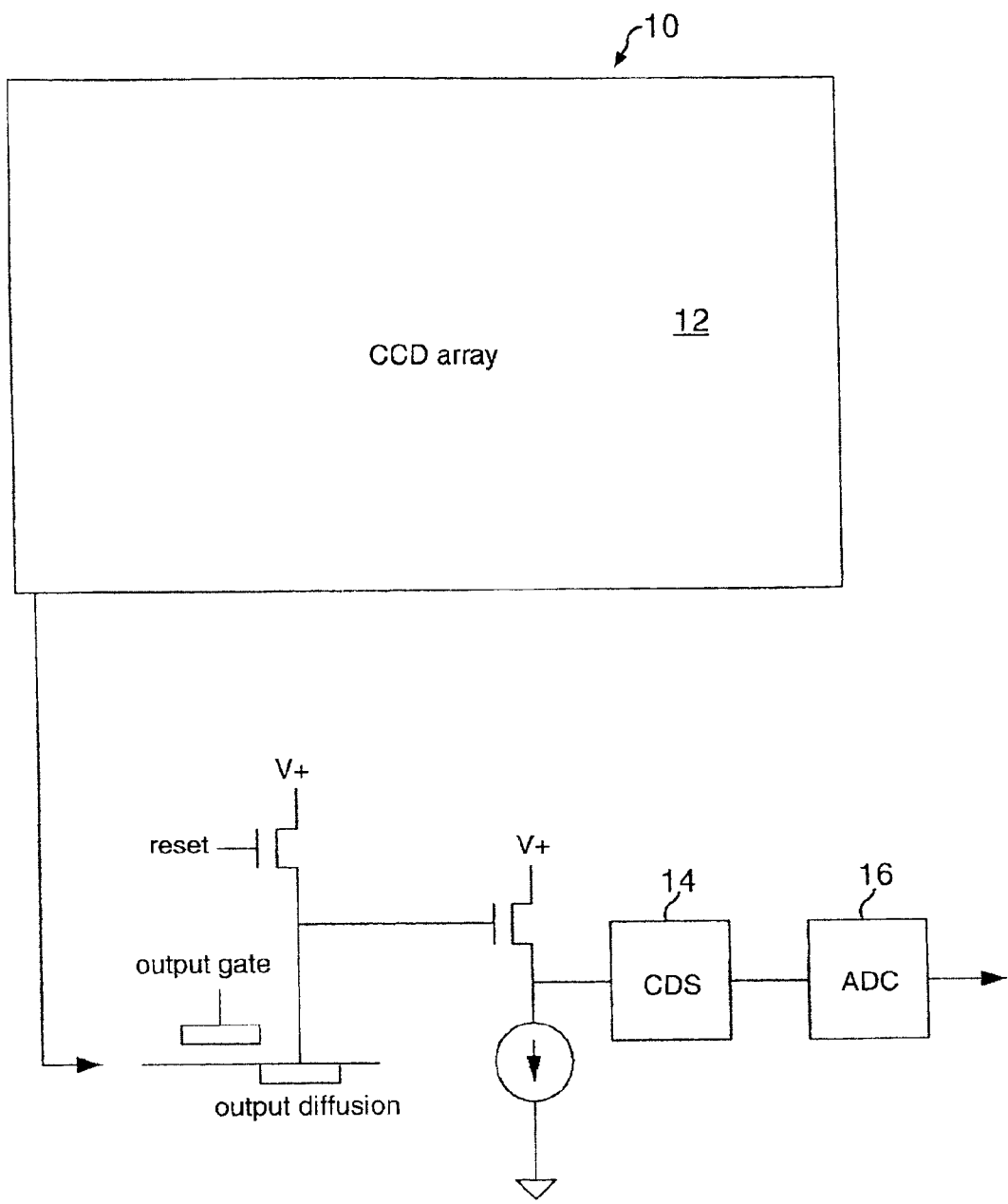
FIG. 1 is a schematic diagram of a prior art CCD array noise reduction device.

Referring first to FIG. 1, a prior-art device 10 comprising a CCD array and a CDS noise cancellation circuit is shown. A CCD array 12 is coupled to an external CDS circuit 14 which subtracts a dark level (including kTC noise) from a dark level plus signal (including the same kTC noise) to yield a result that is free of kTC noise. After the CDS circuit 14 subtracts noise from the signal, an analog-to-digital converter (ADC) 16 then converts the analog signal to a digital signal.

Figure 2:
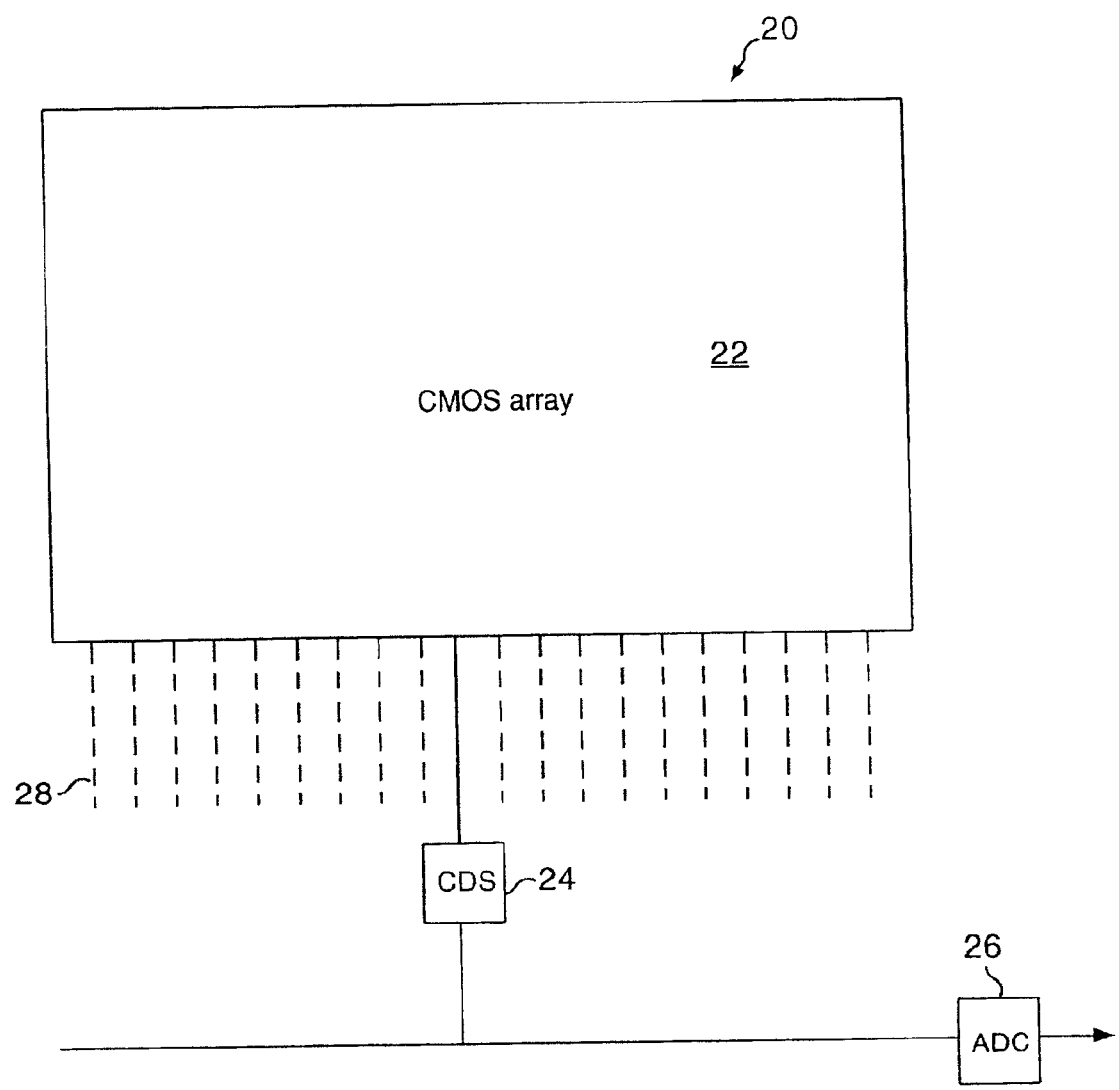
FIG. 2 is a schematic diagram of a prior art CMOS array noise reduction device.

Referring to FIG. 2, a prior-art device 20 comprising a CMOS imaging array is shown including a CDS noise cancellation circuit on an illustrative column line. A CMOS array 22 is coupled to a CDS circuit 24 on the column line. As in the embodiment of FIG. 1, the CDS circuit 24 subtracts kTC noise from the signal. ADC circuit 26 then converts the analog signal to a digital signal. Persons of ordinary skill in the art will appreciate that, in the array of FIG. 2, an individual CDS circuit 24 is coupled to every column line 28, at the periphery of the CMOS active pixel sensor array 22.

Figures 3, 4:
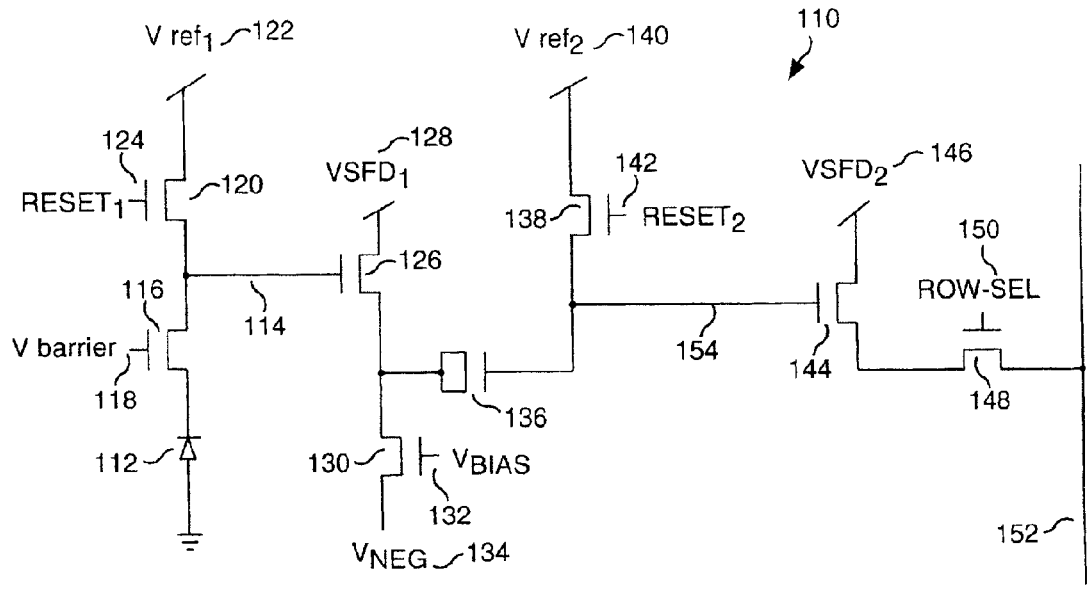
FIG. 3 is a schematic diagram of an illustrative active pixel sensor with noise cancellation according to the present invention.
FIG. 4 is a table illustrating comparative noise data using the active pixel sensor of FIG. 3.

Referring to FIG. 3, an illustrative active pixel sensor 110 with noise cancellation according to the present invention is shown. Active pixel sensor 110 of FIG. 3 employs a photodiode 112 as its photodetector. In the illustrative embodiment of FIG. 3, the anode of the photodiode is the p-type substrate of the integrated circuit. The cathode of the photodiode 112 is coupled to a storage node 114 through a barrier transistor 116. The gate of barrier transistor 116 is coupled to a barrier potential line 118.

A first reset transistor 120 has a drain coupled to a first reset potential line 122, a gate coupled to a first reset signal line 124, and a source coupled to the cathode of photodiode 112 through barrier transistor 116. In alternative embodiments, not shown, barrier transistor 116 may be omitted, and the photodetector is directly connected to the source of first reset transistor 120.

A first source-follower amplifier transistor 126 has a drain coupled to a first source-follower drain potential line 128, a gate coupled to the source of the first reset transistor 120, and a source coupled to the drain of a bias transistor 130. The bias transistor 130 has a gate coupled to a bias potential line 132, and a source coupled to a fixed potential line 134. A capacitor 136 has a first terminal coupled to the source of the first source-follower amplifier transistor 126 and a second terminal coupled to the source of a second reset transistor 138. The second reset transistor 138 has a drain coupled to a second reset potential line 140, and a gate coupled to a second reset signal line 142. A second source-follower amplifier transistor 144 has a drain coupled to a second source-follower drain potential line 146, a gate coupled to the second terminal of the capacitor 136, and a source coupled to the drain of a row-select transistor 148. The row-select transistor 148 has a gate coupled to a row-select line 150, and a source coupled to a column output line 152. In the illustrative circuit of FIG. 3, the transistors 116, 120, 126, 130, 138, 144, and 148 are all approximately minimally sized.

Capacitor 136 may be a MOS capacitor, with the first terminal being a source-drain-substrate terminal and the second terminal being a gate terminal, or the reverse, depending on layout constraints and relative stray terminal capacitances; alternatively, capacitor 136 may be a DRAM capacitor, with the second terminal preferably being the terminal with less stray capacitance to substrate.

In the illustrative circuit of FIG. 3, the kTC noise cancellation circuit includes the first source-follower amplifier transistor 126, bias transistor 130, capacitor 136, and second reset transistor 138.

The amount of noise reduction produced by the circuit of FIG. 3 depends on the size of capacitor 136, larger values of capacitance producing more noise reduction. Actual embodiments of the present invention have employed MOS capacitors of 10 fF, 40 fF, and 80 fF. Once the kTC noise introduced by capacitor 136 is similar in magnitude to the other circuit or imager noise sources (such as amplifier noise or dark leakage current noise), further increases in the size of capacitor 136 will result in decreasing incremental amounts of total noise reduction, ultimately getting to the point where increasing the size of capacitor 136 results in no measurable improvement in total noise performance. The present invention demonstrates noise reduction performance that is within this practical limit. FIG. 4 is a table showing measured noise for several sizes of MOS capacitor used as capacitor 136.

Figure 5:
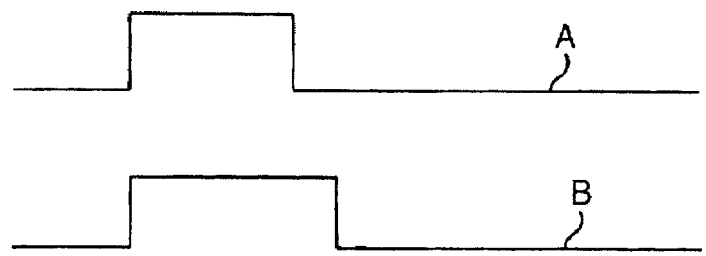
FIG. 5 is a timing diagram illustrating the operation of the active pixel sensor of FIG. 3.

Referring now to FIG. 5, a timing diagram illustrates the timing of the control signals used to drive the circuit of FIG. 3. The active pixel sensor 110 of FIG. 3 is first reset by placing a first reset signal (shown at trace (A) of FIG. 5) on first reset signal line 124 and placing a second reset signal (shown at trace (B) of FIG. 5) on second reset signal line 142. Then, the first reset signal on first reset signal line 124 is deactivated, leaving the dark level plus the reset noise (kTC noise due to resetting the capacitance of storage node 114) on storage node 114. This level is buffered by first source-follower transistor 126, which acts as a low-impedance source, onto the first terminal of capacitor 136. During this time, a second storage node 154 at the gate of second source-follower transistor 144 is held to a reference voltage (the second reset potential) by second reset transistor 138. Thus, the voltage across the capacitance of capacitor 136 stores the reset noise.

When the second reset transistor 138 is turned off, photogenerated charge integration begins. The delay between the deactivation of the first reset signal and the second reset signal can be short, as the settling time of the reset operation is short. The reset noise resulting from second reset transistor 138 turning off is small because the capacitor 136 is fairly large. Capacitor 136 is also large enough to drive second source-follower transistor 144 with small attenuation.

Overall, the circuit of FIG. 3 preserves the high gain from the low capacitance on the first storage node 114, while rejecting the large kTC noise from the low capacitance of storage node 114. In addition, persons of ordinary skill in the art will appreciate that an incidental feature of the circuit of FIG. 3 is that the capacitor 136 steps up the voltage, so the loss of voltage swing due to the first source-follower transistor 126 is substantially eliminated.

Figure 6A:
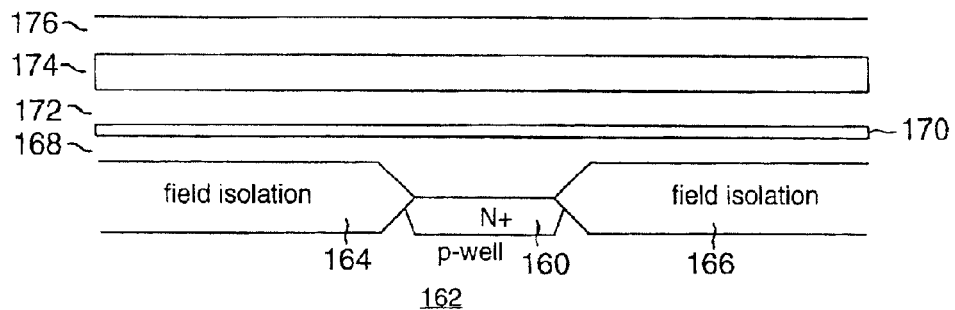
FIGS. 6A through 6G illustrate an example of an embedded DRAM capacitor useful for employing in the present invention and a process for making it.

Referring now to FIGS. 6A through 6G, an example of an embedded DRAM capacitor useful for employing in the present invention and a process for making it are illustrated. As shown in FIG. 6A, an n+ region 160 is formed in a p-well 162 in between two field oxide edges 164 and 166. Note that although not shown in FIG. 6A, this n+ region can be extended to allow for contact to be made to it in the area adjacent to the capacitor structure. A first dielectric layer 168 (e.g., silicon dioxide) is formed over the n+ region 160 and field oxide edges 164 and 166. An etch-stop layer 170 formed from, for example, silicon nitride, is formed over the first dielectric layer 168. A second dielectric layer 172 is formed over the etch-stop layer 170. A first polysilicon layer 174 is formed over the second dielectric layer 172, and a third dielectric layer 176 is formed over the first polysilicon layer 174. FIG. 6A is a cross-sectional view of the structure resulting after these fabrication steps have been performed.

Figure 6B:
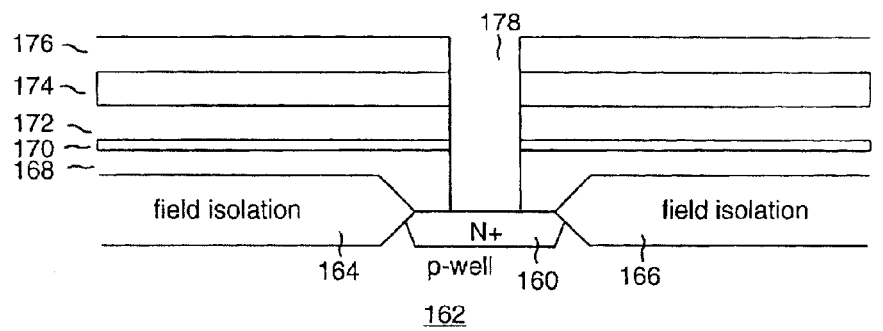

Referring now to FIG. 6B, a trench opening cut 178 is made to expose the surface of the n+ region 160. FIG. 6B is a cross-sectional view of the structure resulting after the trench opening cut is made.

Figure 6C:
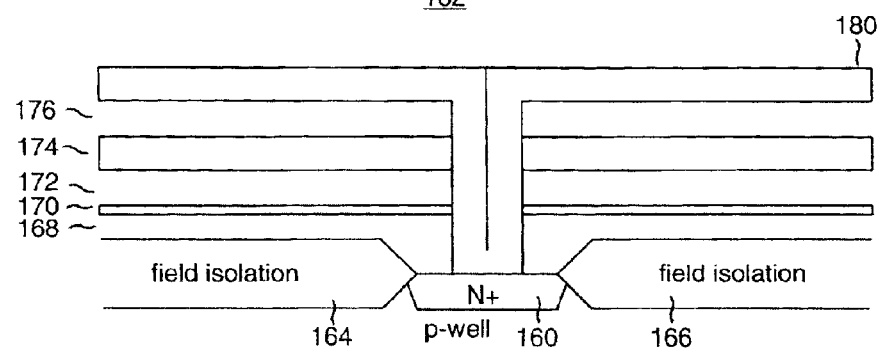

Referring now to FIG. 6C, a second polysilicon layer 180 is formed over the third dielectric layer and in the trench cut 178. Within the trench cut, the second polysilicon layer 180 is now in contact with the first polysilicon layer 174. Additionally, the second polysilicon layer is in contact with the n+ region. FIG. 6C is a cross-sectional view of the structure resulting after the second polysilicon layer 180 is formed.

Figure 6D:
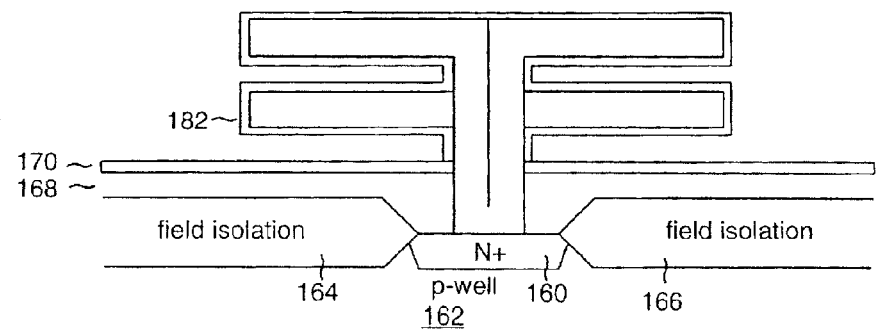

Referring now to FIGS. 6C and 6D, the first and second polysilicon layers 174 and 180 are defined and the second and third dielectric layers 172 and 176 are etched away from the first and second polysilicon layers and down to the etch-stop layer 170. First and second polysilicon layers 174 and 180 form a first plate of the capacitor. A thin oxide layer 182 is grown around the first and second polysilicon layers 174 and 180. Thin oxide layer 182 forms the capacitor dielectric. FIG. 6D is a cross-sectional view of the structure resulting after these fabrication steps have been performed.

Figure 6E:
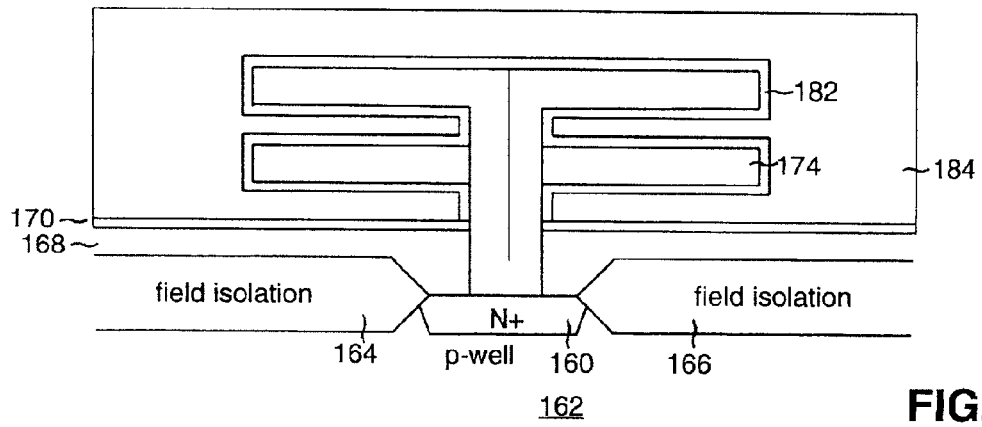

Referring now to FIG. 6E, a third polysilicon layer 184 is deposited around the first and second polysilicon layers 174 and 180 and is separated therefrom by the thin oxide layer 182. FIG. 6E is a cross-sectional view of the structure resulting after the third polysilicon layer 184 is deposited.

Figure 6F:
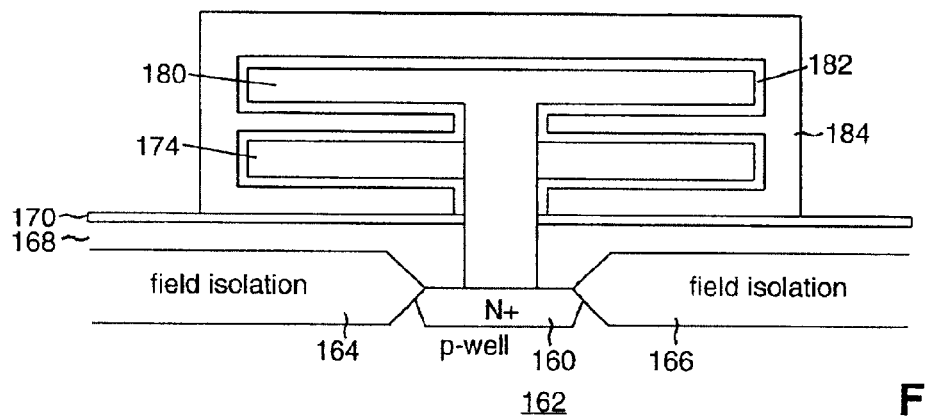

Referring now to FIG. 6F, third polysilicon layer 184 is then defined by an etching step to form a second plate of the capacitor. FIG. 6F is a cross-sectional view of the structure resulting after the third polysilicon layer 184 has been defined.

Figure 6G:
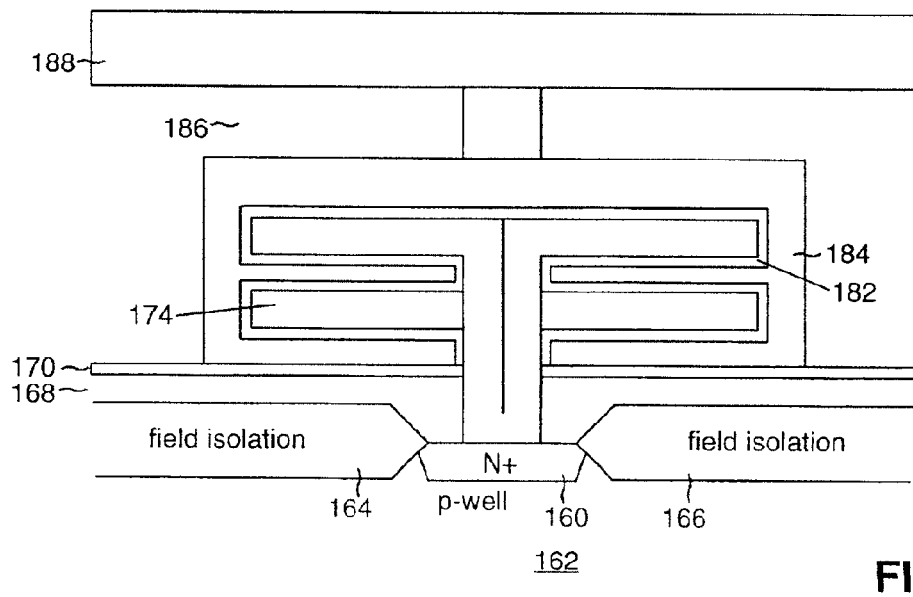

Referring now to FIG. 6G, a dielectric layer 186 is formed over the third polysilicon layer 184. A via is etched through dielectric layer 186 to expose the surface of the third polysilicon layer 184 and a metal line 188 is deposited over the dielectric layer 186 and in the via to make contact with the second plate of the capacitor. As shown in FIG. 6G, the first plate of the capacitor is coupled to the n+ region 160. FIG. 6G is a cross-sectional view of the entire capacitor structure.

The embedded DRAM capacitor can now be used as a capacitor between any two circuit nodes, the first circuit node being connected to the n+ region beneath the bottom plate of the capacitor, and the second circuit node being connected to the metal line that makes contact to the top plate of the capacitor.

Figure 7:
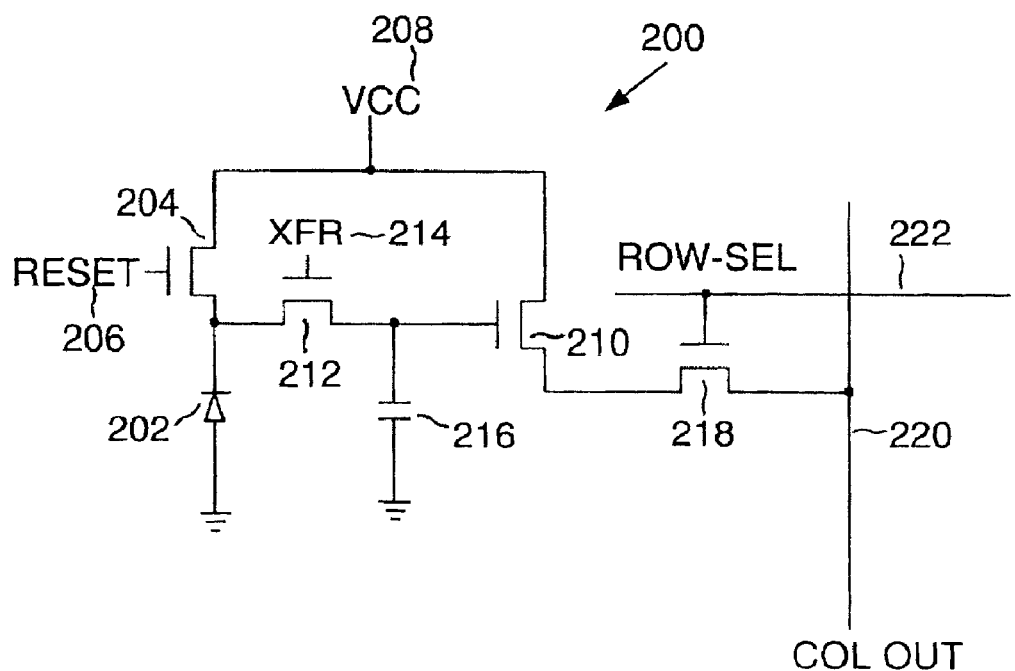
FIG. 7 is a schematic diagram of an illustrative active pixel sensor with an explicit DRAM capacitor according an aspect of the present invention.

Referring now to FIG. 7, a schematic diagram shows an illustrative active pixel sensor 200 with an explicit DRAM capacitor according to an aspect of the present invention. Photodiode 202 has its anode coupled to the semiconductor substrate (shown at the ground symbol) and its cathode coupled to the source of a reset transistor 204. The gate of the reset transistor 204 is coupled to a reset signal 206 and the drain of the reset transistor 204 is coupled to a reset potential 208 (shown as Vcc).

The cathode of the photodiode 202 is coupled to the gate of a source-follower amplifier transistor 210 through a transfer transistor 212. The gate of transfer transistor 212 is coupled to a transfer signal 214. DRAM capacitor 216 is coupled between the gate of the source-follower amplifier transistor 210 and the substrate. In this respect, persons of ordinary skill in the art will appreciate that the DRAM capacitor 216 will be coupled to a p+ region instead of to the n+ region that is shown in FIGS. 6A through 6G. A row-select transistor 218 is coupled between the source of source-follower amplifier transistor 210 and a column output line 220. The gate of the row-select transistor 218 is coupled to a row-select signal 222.

Active pixel sensor 200 of FIG. 7 is operated by turning on the reset signal and the transfer signal. When the reset signal is turned off, integration of photogenerated charge begins. The integration period ends when the transfer signal is turned off. The photogenerated signal is read out of active pixel sensor 200 by asserting the row-select signal 222 at the gate of the row select transistor 218.

Figure 8:
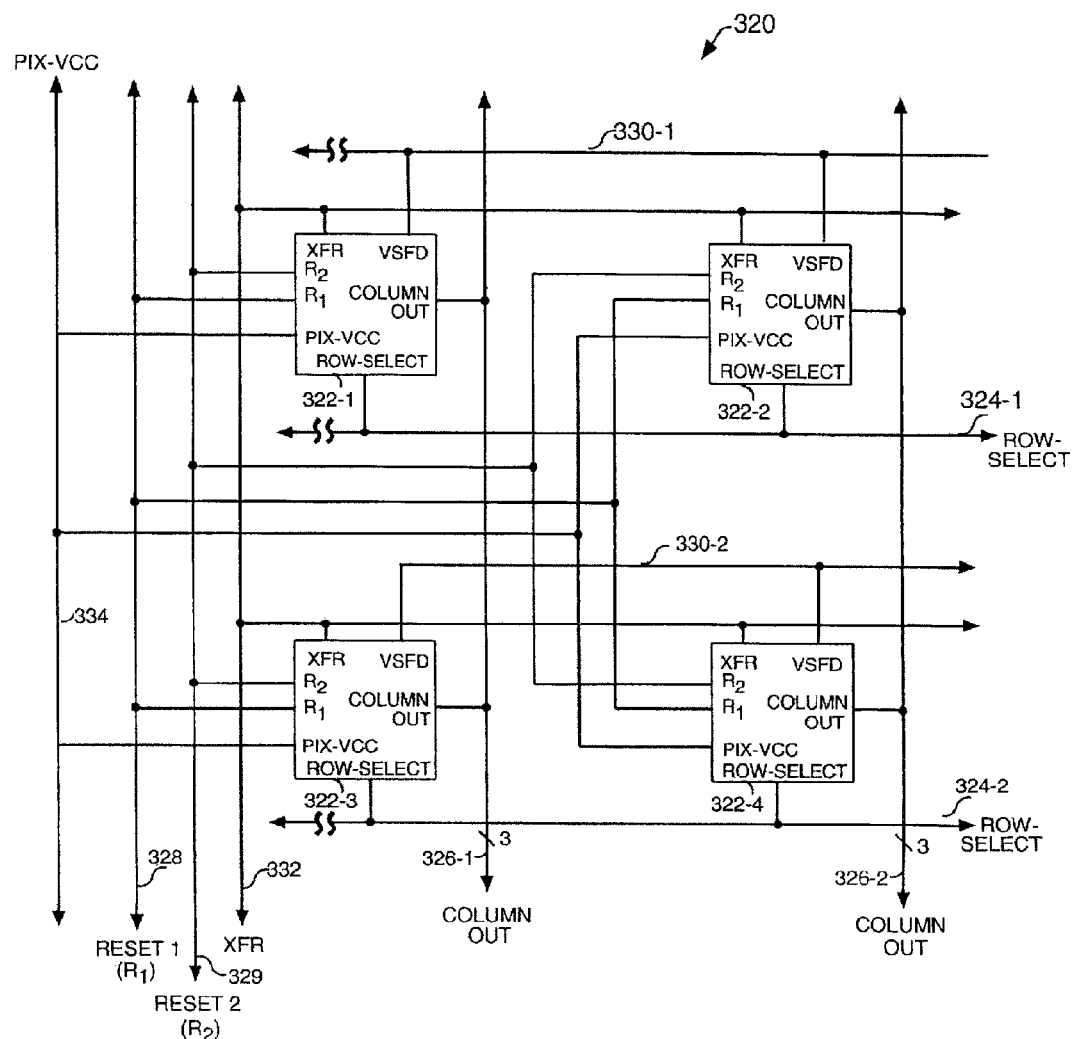
FIG. 8 is a diagram of an illustrative array of active pixel sensors with noise cancellation according to the present invention.

Referring now to FIG. 8, a diagram shows an illustrative 2 by 2 portion 320 of an array of active pixel sensors according to the present invention. Persons of ordinary skill in the art will readily appreciate that the array portion disclosed in FIG. 8 is illustrative only and that arrays of arbitrary size may be fabricated using the teachings herein.

In an embodiment of the array of FIG. 8 that includes active pixel sensors of the type shown in FIG. 3, as would be expected by persons of ordinary skill in the art and as shown in FIG. 3, two RESET lines will be provided for all of the active pixel sensors in the array. In the alternative, in an embodiment of the array of FIG. 8 that includes active pixel sensors of the type shown in FIG. 7, only one RESET line will be provided for all of the active pixel sensors in the array. In addition a XFR line will be provided for all of the active pixel sensors in the array. As presently preferred, a separate VSFD line is provided for each row in the array, although embodiments of the present invention having a single VSFD node are also contemplated. If the active pixel sensor employed is a vertical multi-color active pixel sensor, the source of the row select transistor for each color in a column of the array will be coupled to a separate column line associated with that column and the gate of all row select transistors for all colors for each color group of active pixel sensors in a row of the array will be coupled to a ROW-SELECT line associated with that row.

The 2 by 2 portion 320 of the array in FIG. 8 includes two rows and two columns of active pixel sensors according to the present invention. A first row includes active pixel sensors 322-1 and 322-2; a second row includes active pixel sensors 322-3 and 322-4. A first column includes active pixel sensors 322-1, 322-3; a second column includes active pixel sensors 322-2 and 322-4.

A first ROW-SELECT line 324-1 is connected to the row-select inputs (ROW-SELECT) of active pixel sensors 322-1 and 322-2. A second ROW-SELECT line 324-2 is connected to the row-select inputs (ROW-SELECT) of active pixel sensors 322-3 and 322-4. The first and second ROW-SELECT lines may be driven from a row decoder (not shown) as is well known in the art.

A first set of three (blue, green, and red) COLUMN OUT lines 326-1 is connected to the outputs of active pixel sensors 322-1 and 322-3. A second set of three COLUMN OUT lines 326-2 is connected to the outputs of active pixel sensors 322-2 and 322-4. The first and second sets of COLUMN OUT lines are coupled to sets of column readout circuits (not shown) as is well known in the art.

A RESET 1 line 328 is connected to the reset ($R_1$) inputs of all of the active pixel sensors 322-1 through 322-4. A RESET 2 line 329 is connected to the reset ($R_2$) inputs of all of the active pixel sensors 322-1 through 322-4. As indicated above, in one embodiment encompassing active pixel sensors such as those shown in FIG. 3, both RESET lines 328, 329 will be utilized without a XFR line 332. Also as indicated above, in one embodiment encompassing active pixel sensors as shown in FIG. 7, only one RESET line will be utilized.

A first VSFD line 330-1 is connected to the VSFD inputs of the active pixel sensors 322-1 and 322-2 in the first row of the array. A second VSFD line 330-2 is connected to the VSFD inputs of the active pixel sensors 322-3 and 322-4 in the second row of the array. A global XFR line 332 is connected to the XFR inputs of all of the active pixel sensors 322-1 through 322-4. As indicated above, in one embodiment encompassing active pixel sensors such as those shown in FIG. 3, a XFR line 332 will not be utilized.

A global PIX-VCC line 334 is connected to the PIX-VCC inputs of all of the active pixel sensors 322-1 through 322-4. Alternately, multiple PIX-VCC lines (one for each column) could be provided.

Figure 9:
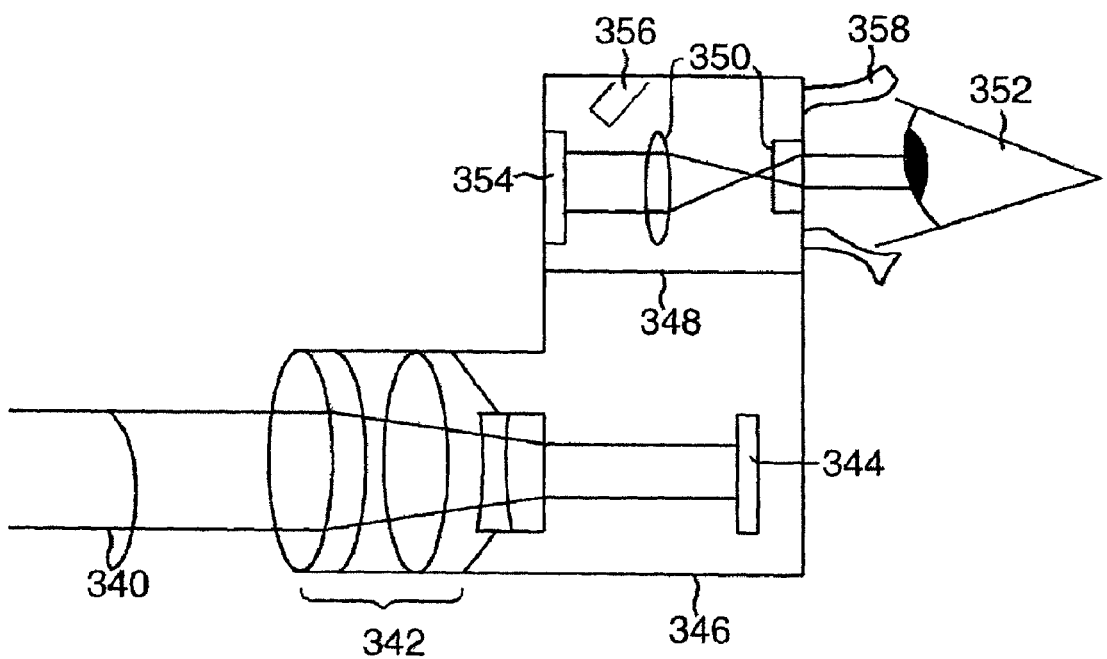
FIG. 9 is a diagram of an illustrative electronic camera according to the present invention.

A preferred digital still camera encompassing the present invention is illustrated in FIG. 9. Rays of light 340 from a scene to the left of the figure are focused by primary optical system 342 onto a sensor chip 344 containing an array of active pixel sensors according to the present invention. Optical system 342 and sensor chip 344 are housed within light-tight housing 346 to prevent stray light from falling on sensor chip 344 and thereby corrupting the image formed by rays 340. An electronic system, not illustrated in FIG. 9, takes electrical signals from sensor chip 344 and derives electrical signals suitable for driving display chip 354, which can be either of the micro-machined reflective type as supplied by Texas Instruments, or of the liquid-crystal coated type, as supplied by micro-display vendors such as Kopin, MicroDisplay Corp. or Inviso.

Display chip 354 is illuminated by light-emitting-diode (LED) array 356. Reflected light from display chip 354 is focused by secondary optical system 350 in such a manner that images can be viewed by the eye 352 of the user of the camera. Alternatively, display chip 354 can be an organic light-emitting array, in which it produces light directly and does not require LED array 356. Both technologies give bright displays with excellent color saturation and consume very little power, thus being suitable for integration into a compact camera housing as illustrated in FIG. 9. A light-tight baffle 348 separates the chamber housing sensor chip 344 from that housing LED array 356, display chip 354, and secondary optical system 350. Viewing the image from display chip 354 in bright sunlight is made easier by providing rubber or elastomer eye cup 358.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An active pixel sensor comprising:

a photodetector;

a reset switch coupled between a reset potential line and said photodetector and controlled by a reset signal line;

an amplifier coupled to said photodetector;

a kTC noise cancellation circuit disposed within the pixel sensor;

a readout circuit coupled to said kTC noise cancellation circuit and controlled by a row-select line.

2. An active pixel sensor disposed on a substrate, comprising:

a photodetector a first reset transistor having a drain coupled to a first reset potential, a gate coupled to a first reset signal line, and a source coupled to said photodetector;

a first source-follower amplifier transistor having a drain coupled to a first source-follower drain potential, a gate coupled to said photodetector, and a source;

a bias transistor having a drain coupled to said source of said source-follower amplifier transistor, a gate coupled to a bias potential, and a source coupled to a fixed potential;

a capacitor having a first terminal coupled to said source of said first source-follower amplifier transistor and a second terminal;

a second reset transistor having a drain coupled to a second reset potential, a gate coupled to a second reset signal line, and a source coupled to said gate terminal of said capacitor;

a second source-follower amplifier transistor having a drain coupled to a second source-follower drain potential, a gate coupled to said gate terminal of said capacitor, and a source; and a row-select transistor having a drain coupled to the source of said second source-follower amplifier transistor, a gate coupled to a row-select line, and a source coupled to a column output line.

3. The active pixel sensor of claim 2 wherein said source of said reset transistor and said gate of said first source-follower amplifier transistor are coupled to said photodetector through a barrier transistor having a gate coupled to a barrier potential.

4. The active pixel sensor of claim 2, wherein said capacitor is a MOS capacitor.

5. The active pixel sensor of claim 2, wherein said capacitor is an embedded DRAM capacitor.

6. The active pixel sensor of claim 5, wherein said second terminal of said DRAM capacitor has less stray capacitance to substrate than said first terminal.

7. A method for reducing kTC noise in a CMOS active pixel sensor comprising:

applying a reset potential to a photodetector within the active pixel sensor;

storing a noise component of said reset potential within said active pixel sensor;

integrating photogenerated charge on said photodetector for an integration period to generate a photosignal; and subtracting said noise component from said photosignal within said active pixel sensor.

8. An active pixel sensor comprising:

a photodetector;

an amplifier having an input and an output;

a reset switch coupled between a reset potential line and said photodetector and controlled by a reset signal line;

a transfer switch coupled between said photodetector and said input of said amplifier and controlled by a transfer signal line;

a DRAM capacitor coupled between said input of said amplifier and a fixed potential;

a row-select switch coupled to said output of said amplifier and controlled by a row-select line.

9. An array of active pixel sensors arranged in rows and columns on a semiconductor substrate comprising:

a reset signal line;

a row-select signal line associated with each row of said array;

an column output line associated with each column of said array;

a plurality of CMOS active pixel sensors, each CMOS active pixel sensor associated with one row and one column of said array and including:

a photodetector;

a reset switch coupled between a reset potential line and said photodetector and controlled by said reset signal line;

an amplifier coupled to said photodetector;

a kTC noise cancellation circuit disposed within the pixel sensor;

a readout circuit coupled to said photodetector and said kTC noise cancellation circuit and to the one of said output signal lines with which it is associated and controlled by the one of said row-select lines with which it is associated.

10. An array of active pixel sensors arranged in rows and columns on a semiconductor substrate comprising:

a first reset signal line;

a second reset signal line;

a row-select signal line associated with each row of said array;

an column output line associated with each column of said array;

a plurality of active pixel sensors, each active pixel sensor associated with one row and one column of said array and including:

a photodetector a first reset transistor having a drain coupled to a first reset potential, a gate coupled to said first reset signal line, and a source coupled to said photodetector through a barrier transistor having a gate coupled to a barrier potential;

a first source-follower amplifier transistor having a drain coupled to a first source-follower drain potential, a gate coupled to said source of said first reset transistor, and a source;

a bias transistor having a drain coupled to said source of said source-follower amplifier transistor, a gate coupled to a bias potential, and a source coupled to a fixed potential;

a MOS capacitor having a substrate terminal coupled to said source of said first source-follower amplifier transistor and a gate terminal;

a second reset transistor having a drain coupled to a second reset potential, a gate coupled to said second reset signal line, and a source coupled to said gate terminal of said MOS capacitor;

a second source-follower amplifier transistor having a drain coupled to a second source-follower drain potential, a gate coupled to said gate terminal of said MOS capacitor, and a source; and a row-select transistor having a drain coupled to the source of said second source-follower amplifier transistor, a gate coupled to the row-select line with which it is associated, and a source coupled to the column output line with which it is associated.

11. The array of claim 10, wherein each said MOS capacitor is an embedded DRAM capacitor.

* * * * *